Oct. 29, 1968   R. W. HENNING   3,407,982
MUZZLE BUSHING AND FASTENER FOR POWER-ACTUATED TOOLS
Filed April 4, 1966
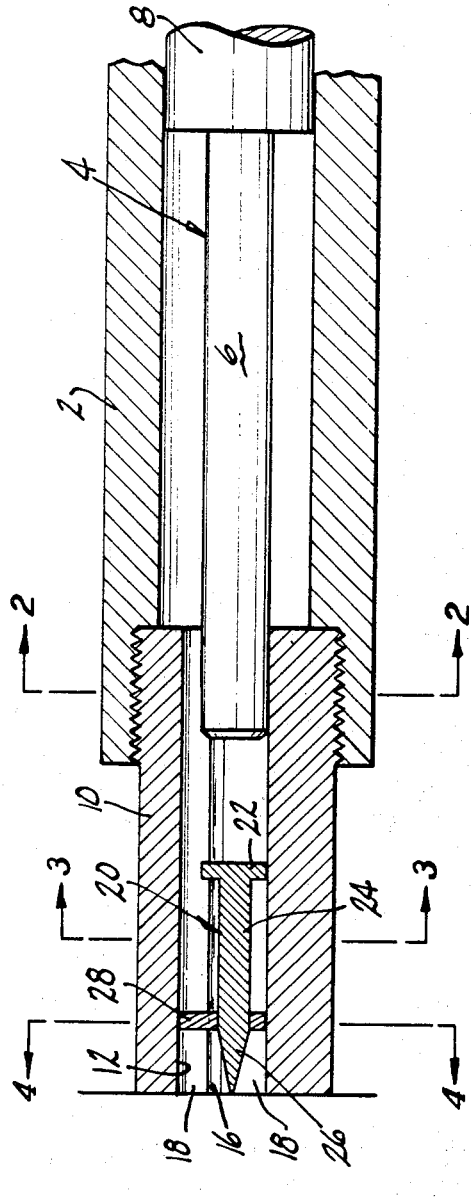
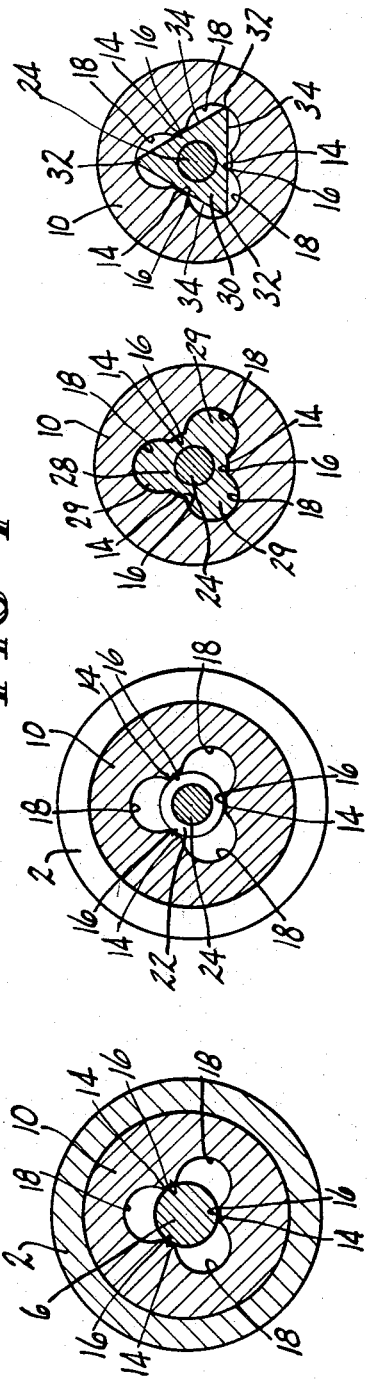
INVENTOR:
ROBERT W. HENNING
BY H. Samuel Kieser
ATTORNEY

United States Patent Office 3,407,982
Patented Oct. 29, 1968

3,407,982
MUZZLE BUSHING AND FASTENER FOR POWER-ACTUATED TOOLS
Robert W. Henning, North Haven, Conn., assignor to Olin Mathieson Chemical Corporation, a corporation of Virginia
Filed Apr. 4, 1966, Ser. No. 540,081
8 Claims. (Cl. 227—9)

ABSTRACT OF THE DISCLOSURE

A power-actuated tool provided with a muzzle bushing having a series of circumferentially spaced guide ribs separated from each other by longitudinally extending grooves. The shank portion of the piston is supported for reciprocal movement by the guide ribs. A fastener having flange means on its shank is supported in the muzzle bushing by virtue of its head portion being in contact with the guide ribs and the flange means extending into the grooves.

---

This invention relates generally to power-actuated tools and more particularly to a muzzle bushing and coacting guide washer especially adapted for use with power-actuated tools of the piston type.

The majority of fasteners presently being used with power-actuated piston tools have a head portion larger than the shank portion. Such fasteners are usually provided with a front guide washer to properly align the fastener within the muzzle bushing of the tool.

In many instances, it is desirable to use a front guide washer which is larger than the head diameter of the fastener. The larger washer serves to effectively increase the bearing area of the head upon the work surface. With the larger bearing surface, the fastener head is prevented from penetrating too deeply into the work surface, especially in those cases wherein the work piece is relatively soft or thin material.

To accommodate the enlarged forward guide washer, the power-actuated piston tools are provided with a matching enlarged counterbore within the forward end of the muzzle bushing. However, with this arrangement, there is no support or guiding of the fastener head or the forward portion of the piston during the latter portion of the driving stroke. This has tended to result in bending of the fastener, broken fastener heads, and bending and chipping of the forward end of the piston member.

With a view toward overcoming the above-mentioned problems, it is an object of this invention to provide an improved muzzle bushing and cooperating fastener guide washer.

More specifically, it is an object of this invention to provide a muzzle bushing wherein fasteners having a guide washer larger than the head thereof can be accommodated and wherein the head and forward end of the piston member are supported throughout the length of the driving stroke.

Yet another object of this invention is to provide a fastener guide washer and muzzle bushing for use in a piston-type tool wherein the fastener will be prevented from bending during the driving stroke.

These and other objects of the invention will become more apparent by reference to the following description and to the accompanying drawings in which:

FIGURE 1 is a cross-sectional view of a portion of a piston-type power-actuated tool constructed in accordance with this invention and showing a fastener positioned within the muzzle bushing.

FIGURE 2 is a sectional view taken along lines 2—2 of FIGURE 1,
FIGURE 3 is a sectional view taken along lines 2—2 of FIGURE 1,
FIGURE 4 is a sectional view taken along lines 2—2 of FIGURE 1; and
FIGURE 5 is a view similar to FIGURE 4, but showing a modified form of the front guide washer of the fastener.

Referring to the drawings, FIGURE 1 shows the forward portion of a power-actuated tool of the piston type including a barrel member 2 and a piston member 4 mounted for axial movement therein. The piston member 4 includes a forward reduced shank portion 6 and a rearward enlarged head portion 8. A muzzle bushing 10 is threadedly, or otherwise, secured to a counterbore in the forward end of the barrel member 2 and extends forwardly, therefrom. It is to be understood that a suitable breech structure is to be mounted at the rearward end of the barrel member 2 to provide a suitable trigger mechanism and explosion chamber for generating explosive gases from a suitable power source such as a powder-containing cartridge or a liquid propellant to drive the piston member 4. As any conventional breech structure may be used in connection with this invention, such structure has not been shown in the drawings.

In accordance with this invention, the muzzle bushing 10 is provided with a trifoliate bore indicated generally by 12. The bore 12 is defined by three circumferentially spaced guide ribs 14 which terminate in arcuate guiding surfaces 16. The guide ribs 14 are separated from each other by a longitudinally extending groove 18. Each of the longitudinal grooves 18 are defined, in cross section, by a surface which comprises an arc of a circle greater than 180°. The guide ribs 14, as well as the longitudinal grooves 18, are evenly spaced about the axis of the muzzle bushing 10 one hundred and twenty degrees.

A fastener 20 is shown positioned in the muzzle bushing 10 ready to be driven by the piston member 4. The fastener 20 includes an enlarged head portion 22, a reduced shank portion 24 and a forward tapering tip portion 26. A trifoliate guide washer 28, shown in FIGURE 4, is mounted on the shank portion 24 rearwardly of the tip portion 26. The guide washer 28 includes three circumferentially spaced projections 29 which are received within the grooves 18 in the muzzle bushing 10.

As shown in FIGURE 3, the head portion 22 of the fastener 20 is supported by the guide surfaces 16 of the guide ribs 14. The guide surfaces 16 also support the forward end of the shank portion 6 of the piston member 4 as shown in FIGURE 2. The shank portion 24 and tip 26 of the fastener 20 are held in proper axial alignment in the bore 12 of the muzzle bushing 10 by virtue of the trifoliate guide washer 28 which is supported about its outer periphery by the surface defining the longitudinal grooves 18 and guide surfaces 16 as shown in FIGURE 4.

FIGURE 5 shows a modified form of a front guide washer which may be used with the muzzle bushing 10 of this invention. The modified guide washer 30 is generally triangularly shaped with each of the apexes of the triangle extending into the grooves 18 of the muzzle bushing 10. The apexes may be slightly rounded as indicated at 32 to provide a larger bearing surface with the bottom of the grooves 18. The washer 30 is so configured that its sides 34 are in engagement with the guide ribs 14.

By virtue of the above-described arrangement, a muzzle bushing 10 and coacting guide washer for a fastener is provided wherein the guide washer has a larger bearing surface than the head of the fastener and wherein the head of the fastener and forward end of the shank portion of the piston member are adequately supported during the driving stroke.

Various other modifications and alterations will suggest themselves readily to persons skilled in the art. It is intended therefore that the foregoing be considered as exemplary only, and that the scope of the invention be ascertained from the following claims:

What is claimed is:

1. In a power-actuated piston tool, the combination of tubular means having a trifoliate bore, a fastener positioned within said bore and having a head portion supported by said bore and a reduced shank portion, and trifoliate flange means positioned on said shank portion, mating with said trifoliate bore of said tubular means and in supported engagement therewith, said flange means having a large bearing surface than said head portion.

2. In a power-actuated tool, barrel means having a bore, muzzle bushing means attached to and extending forwardly from said barrel means and having a bore, said bore of said muzzle bushing means being defined by a series of circumferentially spaced guide ribs separated from each other by longitudinally extending grooves, piston means including a head portion supported for reciprocal movement by said barrel means and a reduced shank portion supported for reciprocal movement by said guide ribs.

3. The power-actuated tool of claim 2 in combination with fastener means positioned in said muzzle bushing means for driving engagement by said piston, said fastener means including a head portion supported by said guide ribs and a reduced shank portion, and flange means positioned on said shank portion and extending into said grooves whereby said flange means is supported by said guide ribs and said grooves.

4. The power-actuated tool of claim 3 wherein said bore of said muzzle bushing means is trifoliate in cross section and said flange means on said shank portion is correspondingly trifoliate.

5. The power-actuated tool of claim 4 wherein each of the grooves in said muzzle bushing means is defined by a surface forming an arc of greater than 180° and said flange means has an outer surface in supported engagement with said surface of said grooves over an arc of greater than 180°.

6. The power-actuated tool of claim 3 wherein said bore of said muzzle bushing means is trifoliate in cross section and said flange means is generally triangular with the apexes thereof extending into and supported by said grooves.

7. The power-actuated tool of claim 6 wherein the sides of said triangular flange means are in supported engagement with said guide ribs.

8. The power-actuated tool of claim 2 in combination with fastener means positioned in said muzzle bushing means for driving engagement by said piston, said fastener means including a head portion supported by said guide ribs and a reduced shank portion, and flange means mounted on said shank portion and extending into said grooves and being supported thereby.

References Cited

FOREIGN PATENTS 737,968    10/1955    Great Britain.
1,030,110    5/1958    Germany.

TRAVIS S. McGEHEE, *Primary Examiner.*